UNITED STATES PATENT OFFICE.

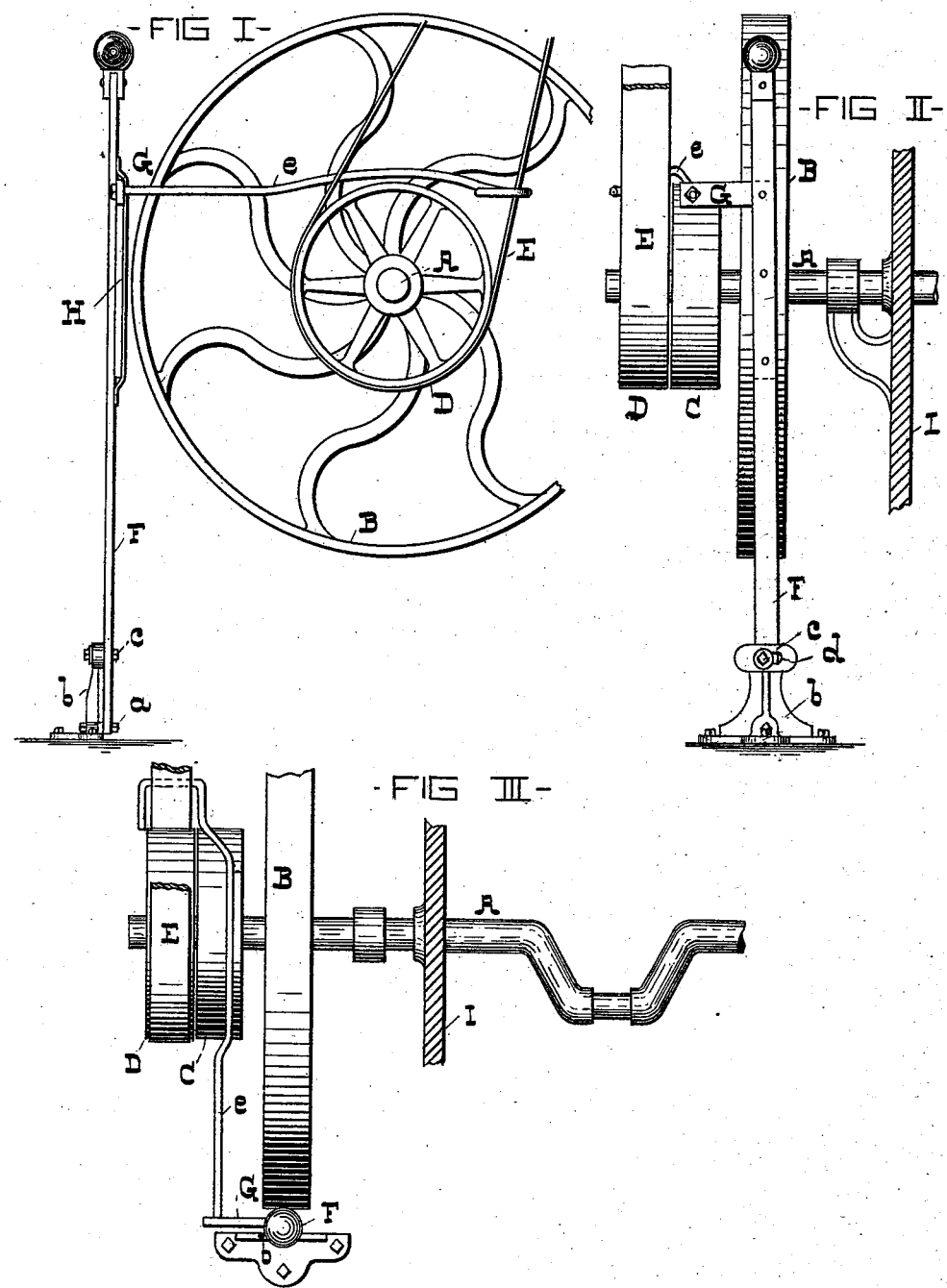

JOHN F. W. DORMAN, OF BALTIMORE, MARYLAND.

BRAKE AND BELT-SHIFTER.

SPECIFICATION forming part of Letters Patent No. 380,253, dated March 27, 1888.

Application filed October 29, 1887. Serial No. 253,699. (No model.)

*To all whom it may concern:*

Be it known that I, JOHN F. W. DORMAN, of the city of Baltimore, in the State of Maryland, have invented certain Improvements in a Combined Brake and Belt-Shifter, of which the following is a specification.

This invention relates to certain improvements in a device to be applied to printing-presses, punching-machines, and various other machines in which a heavy fly-wheel is employed, whereby, after the belt is shifted from the tight to the loose pulley, the fly-wheel may be stopped by a movement of a lever connected to and forming a part of the belt-shifting mechanism, as will hereinafter fully appear.

In the further description of the said invention which follows reference is made to the accompanying drawings, forming a part hereof, and in which—

Figure I is a side view of the invention as applied to a portion of a machine, such as a printing-press. Fig. II is a front view of Fig. I. Fig. III is a top view of Fig. II.

Similar letters of reference indicate similar parts in all the figures.

A is the shaft of the machine, carrying the fly-wheel B; and C and D are respectively the tight and the loose pulley, applied to the shaft in the usual manner. The driving-belt is denoted by E.

F is a spring-lever pivoted at *a* to the stand *b*, secured to the floor. In order to limit the vibratory movement of the spring-lever F, the same is provided with a pin, *c*, adapted to slide in a slot, *d*, in the upper end of the stand *b*, as will be readily understood by reference to Fig. II of the drawings.

G is an arm secured to the spring-lever F, so as to project from its side, and to this arm is secured the shifting-rod *e*, which is of the usual form.

H is a brake consisting of a plate covered with leather or some other flexible material fastened to the face of the spring-lever F.

In order to simplify and cheapen the invention, I may form the brake-plate as an extension of the arm G, as shown in the drawings.

The position of the lever is such that when it is moved from right to left, so as to carry the belt from the tight to the loose pulley, it is directly in front of the fly-wheel, and with its brake a short distance from the periphery of the same. While the lever is in this position the brake may be applied by merely forcing the said spring-lever F toward the fly-wheel.

A part of the frame of the machine is shown and denoted by I.

I am aware that belt-shifters and brakes have been combined in various machines, so that in case of accident to any part of the machine the shifter and brake are automatically and simultaneously applied; but such an arrangement will not answer the purpose of my invention, as in many cases the brake must not be applied at the moment the belt is shifted.

I claim as my invention—

1. In combination with the shaft A, carrying the fly-wheel B and the tight and loose pulleys C and D, the pivoted spring-lever F, carrying a brake and also a belt-shifting rod, substantially as and for the purpose specified.

2. In combination with the shaft A, carrying the fly-wheel B and the tight and loose pulleys C and D, the pivoted spring-lever F, arm G, shifting-rod *e*, and the brake H, substantially as and for the purpose specified.

JOHN F. W. DORMAN.

Witnesses:
DANL. FISHER,
JNO. T. MADDOX.